United States Patent
Sturdevant

(10) Patent No.: US 6,305,236 B1
(45) Date of Patent: Oct. 23, 2001

(54) WORM GEAR TORQUE APPARATUS

(75) Inventor: George A. Sturdevant, Kingwood, TX (US)

(73) Assignee: George A. Sturdevant, Inc., Houston, TX (US)

( * ) Notice: Subject to any disclaimer, the term of this patent is extended or adjusted under 35 U.S.C. 154(b) by 0 days.

(21) Appl. No.: 09/356,764

(22) Filed: Jul. 12, 1999

(51) Int. Cl.[7] .................... B25B 17/00; F16H 1/16
(52) U.S. Cl. .................. 74/425; 74/421 A; 81/57.13; 81/57.29
(58) Field of Search ................. 74/421 A, 425, 74/606 R; 81/56, 57.13, 57.29, 57.26, 57.12, 57.14, 57.3, 57.31

(56) References Cited

U.S. PATENT DOCUMENTS

| | | | | |
|---|---|---|---|---|
| 1,245,921 | * | 11/1917 | Holderen | 81/57.29 |
| 1,346,716 | * | 7/1920 | Lee | 81/57.29 |
| 1,698,618 | * | 1/1929 | Bigelow | 81/57.29 |
| 1,852,776 | * | 4/1932 | Hodeaux | 74/425 |
| 2,641,139 | * | 6/1953 | Beisner | 74/425 |
| 2,868,031 | * | 1/1959 | Schumb | 74/425 |
| 3,373,637 | * | 3/1968 | Behnke | 74/421 A |
| 3,498,159 | * | 3/1970 | Wilmeth | 81/57.13 |
| 4,185,514 | * | 1/1980 | Edwards | 74/425 |
| 4,215,599 | * | 8/1980 | Batchelder et al. | 81/57.29 |
| 4,322,989 | * | 4/1982 | Garolis | 81/57.13 |
| 4,325,274 | * | 4/1982 | Martelee | 81/57.13 |
| 5,630,343 | * | 5/1997 | Begin | 81/57.13 |
| 5,934,156 | * | 8/1999 | Phillips | 74/606 R |

* cited by examiner

Primary Examiner—David A. Bucci
Assistant Examiner—William C. Joyce
(74) Attorney, Agent, or Firm—Browning Bushman P.C.

(57) ABSTRACT

A torque applying tool (10) having a housing or body (14) including a rectangular body portion (16) having a worm receiving opening (20) extending therethrough and an arcuate housing portion (18) having a gear receiving opening (22) extending therethrough at right angles to the worm receiving opening (20). A toothed gear (26) is mounted within gear receiving opening (22) and has a central opening (32) of a hexagonal shape to receive nut (N) therein to be rotated. Worm gear (38) is received within worm receiving opening (20) and has a helical thread (39) thereon formed of a concave shape to engage teeth (28) on gear (26) for rotation of gear (26) and nut (N).

5 Claims, 4 Drawing Sheets

WORM GEAR TORQUE APPARATUS

FIELD OF THE INVENTION

The present invention relates to a worm gear torque apparatus, and more particularly to such a worm gear torque device to rotate a nut for applying a torque force.

BACKGROUND OF THE INVENTION

Flanges, joints, and various pressure lines and pressure vessels are widely used in the industry. Opposed flanges on separate members are formed with aligned openings and the two members are joined to one another in a pressure type manner by first providing a gasket between the two flanges and then by connecting the flanges together with threaded stud-like members, such as studs, bolts, or stud-bolts, which extend through the aligned openings and have a nut engaged thereon. The amount of torque applied to the nuts normally determines the tensioning of the studs. It is important, particularly in large diameter members, that the tension in the studs be sufficient to withstand imposed forces and be uniform as to avoid deformation of the flanges and the members to which they are fixed. The term "stud" as used herein refers to stud-like members to which the invention applies.

Various devices have been provided heretofore for tensioning studs and have been hydraulically actuated as well as non-hydraulically actuated. The nuts are normally rotated by a driving member fitting over the nuts for rotating the nuts in a manner sufficient to obtain the desired tensioning of the stud on which the nut is positioned.

Prior art stud tensioning devices have utilized a gear fitting over a nut in driving relation with the gear rotated by a power mechanism engaging the gear for rotating the gear and the nut. The nut is threaded onto a stud for tensioning the stud. A power device, such as a fluid motor or reciprocating cylinder, has been removably connected to the drive mechanism for effecting rotation of the gear and the associated nut.

In subsea operations the flange members are connected to each other in subsea completion systems, such as completion systems for subsea gas wells, and it is desirable that stud tensioning devices be operated from remotely operated vehicles (ROV), particularly at increased water depths. Many of the subsea oil and gas wells are positioned at water depths over 2,000 feet which is generally undesirable for divers. The torque applying device must be capable of fitting over a nut and powered from a suitable fluid motor for rotation to obtain the desired tensioning of the stud.

In some subsea uses, the torque device is utilized for applying a torque to a shaft for rotating or driving a separate member. For example, an adapter having a male hexagonal end may be inserted within the gear opening with the adapter receiving a shaft on an opposite end for rotating the shaft. The shaft may be connected to a valve for actuating the valve, for example.

It is an object of the present invention to provide a device for tensioning studs which is easily positioned about a nut on the stud for rotation of the nut to a desired tensioning of the stud.

Another object of the invention is to provide such a tensioning device which is particularly adapted for subsea use and operation from a remotely operated vehicle (ROV).

SUMMARY OF THE INVENTION

The present invention is directed to a torque applying apparatus having a torque applying device or tool including a worm gear on a drive shaft for engaging and rotating a toothed gear having a central opening receiving a male hexagonal member such as a nut or bolt head. The drive shaft extends axially in a direction perpendicular to the longitudinal axis of the stud. An extending end of the drive shaft has a drive connection for releasable connection to a drive motor, such as an electric hydraulic or electric pneumatic motor, for rotation of the drive shaft and nut. The central opening of the gear corresponds in shape to the nut for receiving the nut with the planar surfaces defining the opening engaging corresponding surfaces of the nut.

The worm gear has a central outer concave periphery including a helical thread engaging in meshed relation the outer surfaces of teeth about the toothed gear for driving rotation of the gear. The direction of rotation of the toothed gear and nut may be reversed by reversal of the rotation of the fluid motor within any repositioning of the tool. A predetermined driving force may be provided by the drive motor and the drive shaft may be easily engaged and driven by a suitable drive motor from a ROV in a subsea environment such as required for subsea wells on the sea floor. Various sizes of toothed gears and worm gears may be provided for different nut sizes and different stress limits for the studs. One embodiment of the invention utilizes a nut drive for an extension socket or the like for exerting a torque on another nut or rotatable member.

Other features and advantages of the invention will be apparent from the following specification and drawings.

DESCRIPTION OF THE INVENTION

Figure 1:
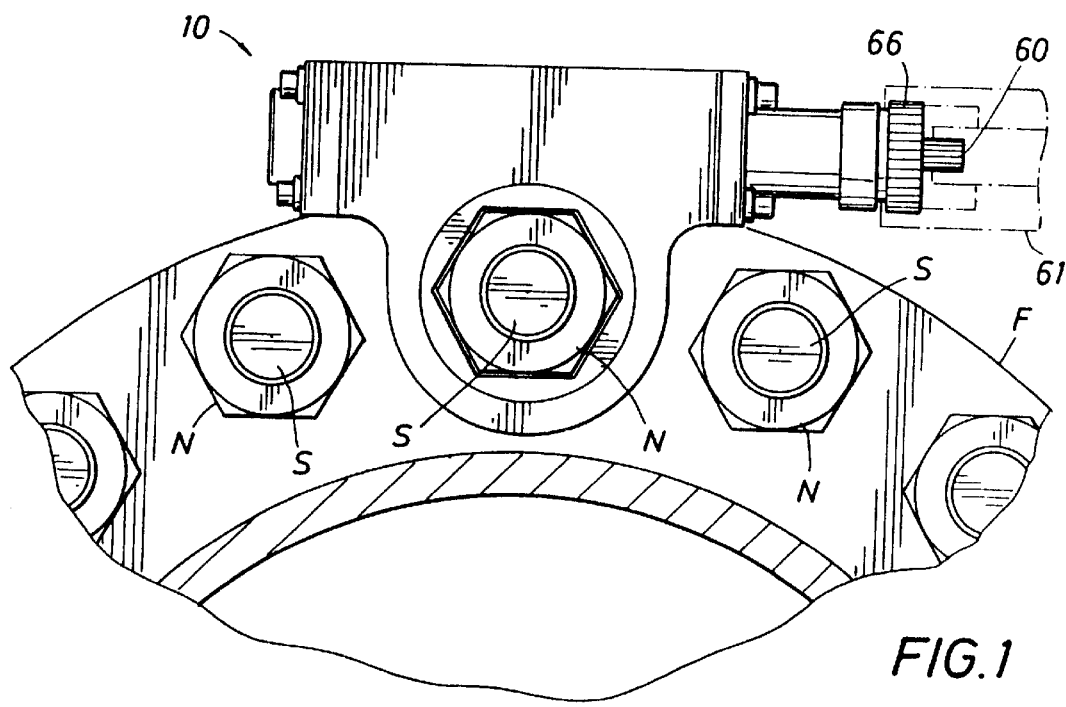
FIG. 1 is a diagrammatic view showing the torque applying tool of the present invention fitting about a nut on a stud extending from a flange for tightening of the nut and tensioning of the stud.

Referring now to the drawings for a better understanding of this invention, and more particularly to the embodiment shown in FIGS. 1–4, a generally schematic showing of the torque applying apparatus of the present invention is shown at 10 in FIG. 1. Torque applying device or tool 10 is shown as fitting about a nut N on a threaded end of stud S which extends upwardly through an opening in flange F. Stud S which is secured to a subjacent flange is tensioned a predetermined amount upon rotation of nut N in one direction. Torque applying device or tool 10 easily receives nut N and is supported on the upper surface of flange F. Studs S and nuts N are normally spaced at arcuate intervals along flange F with adjacent nuts N having corners spaced from each other a distance between about one half (½) inch and two (2) inches. Tool 10 is designed to easily fit between adjacent nuts N as shown in FIG. 1.

Figure 3:
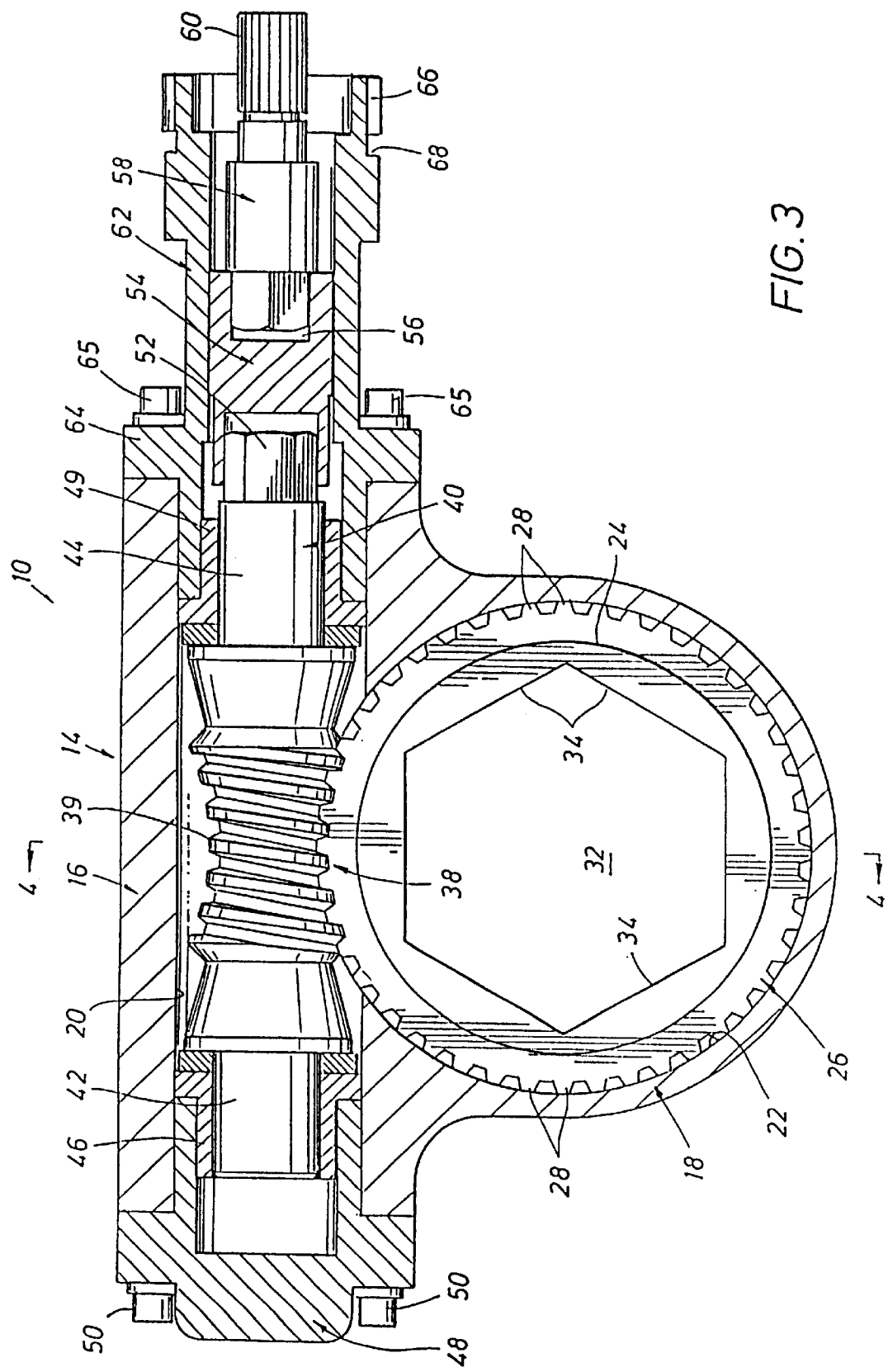
FIG. 3 is a longitudinal sectional view taken through the tensioning device or tool shown in FIG. 2.

Tool 10 has a body or housing 14 including a rectangular body portion 16 and an integral arcuate body portion 18 extending from rectangular body portion 16. Body portion 14 has an axial bore 20 extending therethrough and arcuate body portion 18 has an axial bore 22 extending therethrough at right angles to bore 20. Bores 20 and 22 intersect as shown in FIG. 3 for communication of bores 20 and 22.

Figure 4:
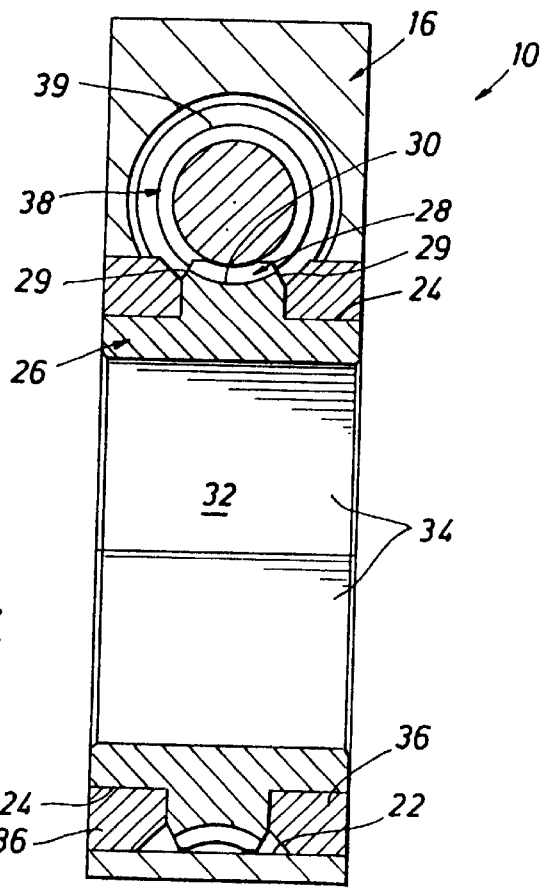
FIG. 4 is a section taken generally along the line 4—4 of FIG. 3.
Figure 2:
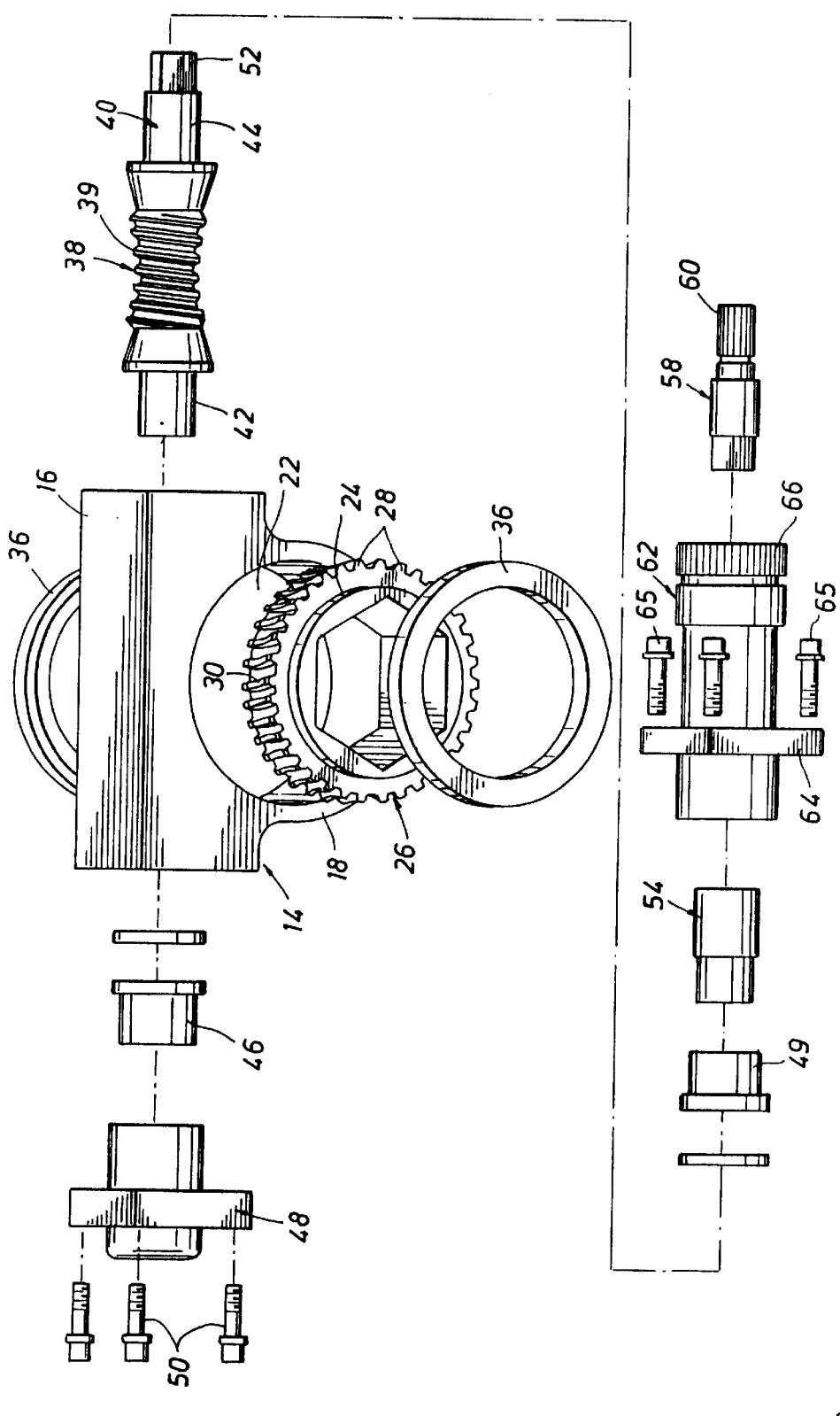
FIG. 2 is an exploded view of the torque applying tool shown in FIG. 1.

A gear generally indicated at 26 fits within opening 22 and has a plurality of teeth 28 about its outer periphery 24. Each tooth 28 has a pair of inclined side surfaces 29 and an outer arcuate surface 30. Teeth 28 adjacent the juncture of bores 20 and 22 project within bore 20 as shown in FIG. 3. Gear 26 has a central opening 32 of a hexagonal configuration or contour defined by flats or planar surfaces 34 to receive hexagonal nut N thereon. The height of gear 26 as shown in FIG. 4 is less than the height of nut N so that gear 26 may be positioned over nut N at any location. Opening 32 can obviously be formed of any desired shape conforming to the shape of nut N. Gear 26 is supported within bearings 36 received within opening 22 for rotation of gear 26.

Mounted within bore 20 for driving rotation of gear 26 is a worm gear generally indicated at 38 having a helical thread 39 and mounted on a drive shaft 40. Drive shaft 40 has opposed end shaft portions 42 and 44. End shaft portion 42 is received within a flanged bearing 46 which is mounted within an end cap 48 secured by bolts 50. End shaft portion 44 is supported within a flanged bearing 49 and has an end drive connection 52 with planar surfaces received within an inner end of socket member 54. Socket member 54 has an outer end socket 56 receiving an end drive member 58 having a splined end connection 60 for engagement with a suitable drive motor shown at broken lines at 61 in FIG. 1 for rotation of end drive member 58, socket member 54, and drive shaft 40 for rotating worm gear 38. Socket member 54 and end drive member 58 are mounted within a motor adapter housing generally indicated at 62 having an end flange 64 bolted to housing 16 by bolts 65. Housing 62 has a splined end 66 and an annular abutment 68 adjacent splined end 66. Drive motor 61 has an end meshing with splined end 66 and positioned against abutment 68 for proper mating of drive motor 61 onto spined end 60. Rotation of drive shaft 40 rotates worm gear 38 and tooth gear 26 for rotation of nut N.

Operation

In operation, torque applying or tensioning device 10 is positioned over a nut N to be rotated for tensioning a threaded stud S threaded onto nut N. Nut N is received within opening 32 of gear 26 with the lower surface of tensioning device 10 supported on the upper surface of flange F as shown in FIG. 1. In this position, fluid motor 61 is fitted over splined end 66 with splined outer end connection 60 meshing with a drive member of motor 61 for rotating outer end connection 60 thereby to rotate worm gear 38 and toothed gear 26 for tensioning stud S under a predetermined force. Upon tightening of nut N to the desired force level, tool 10 is removed and may be positioned over an adjacent stud until all of the studs S for a flanged connection have been tensioned to the desired force level. A suitable drive motor is sold by Air Tool of Houston, Texas under Model 55 RNRT-2T.

Figure 5:
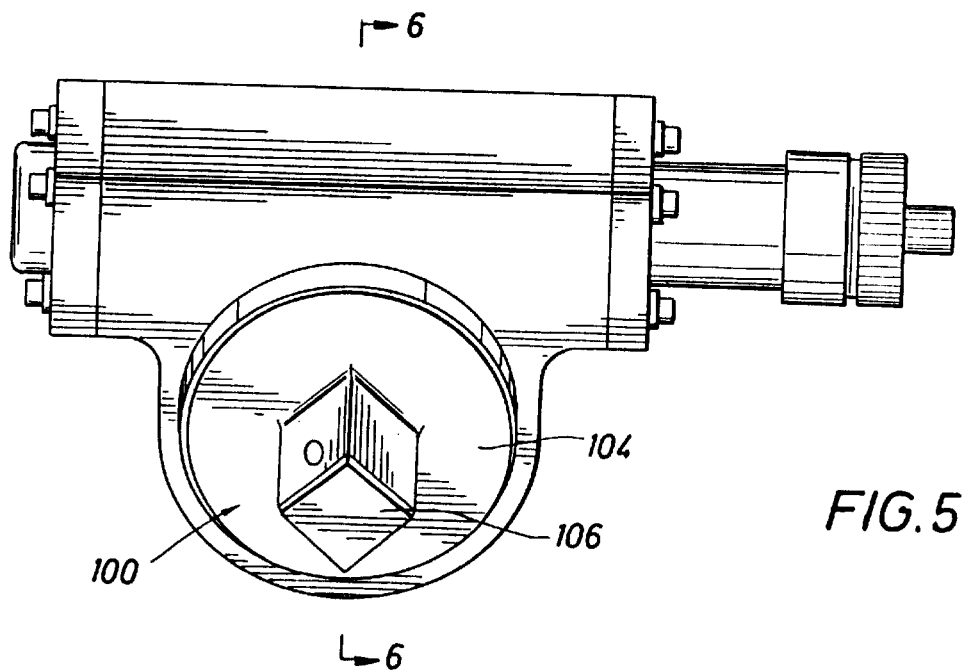
FIG. 5 is a perspective view of the torque applying tool of the present invention utilized for rotating a nut having a square drive lug extending therefrom to rotate a socket extension for subsequent rotation of a separate member.
Figure 6:
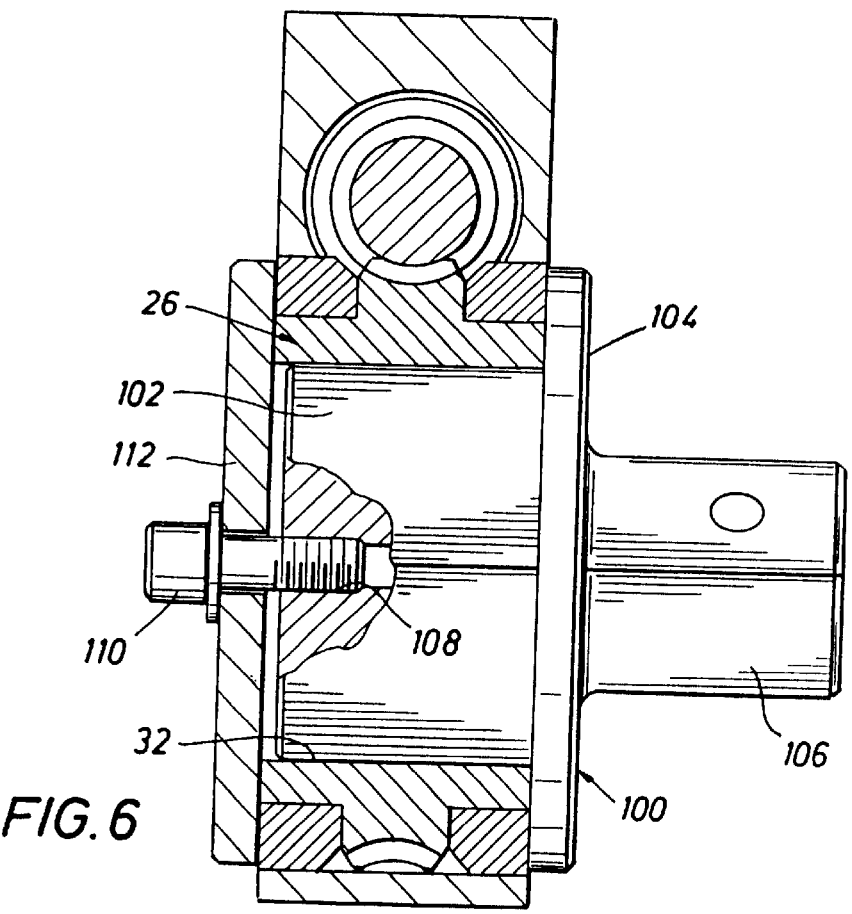
FIG. 6 is a sectional view taken generally along line 6—6 of FIG. 5.

Embodiment of FIGS. 5 and 6

Referring to the embodiment shown in FIGS. 5 and 6, torque applying tool 10 is illustrated for use with a separate drive adapter shown generally at 100. Tool 10 is identical to the tool of FIGS. 1–5 except for drive adapter 100. Drive adapter 100 has an adapter body or nut 102 thereon which fits within hexagonal opening 32 of gear 26. Adapter body or nut 102 has an integral flange and an integral square drive connection 106 extending outwardly from flange 32 adapted for fitting within a socket for a suitable extension tool. Nut 102 has a threaded opening 108 therein and an externally threaded bolt 110 is bottomed within opening 108. A washer 112 receives bolt 110. Thus, washer 112 and bolt 110 rotate with nut 102. The socket extension tool (not shown) is utilized for rotating a nut or other member to be driven. Thus, nuts that may be inaccessible to the tool as shown in FIGS. 1–4 are accessible to the arrangement shown in FIGS. 5 and 6 with the use of a suitable extension socket. A single drive nut 102 may be utilized for rotation of different sizes of nuts within a desired power range.

Another adapter (not shown) similar to adapter 100 may be utilized with a socket end instead of drive connection 106 with the socket end receiving a shaft for rotating a separate member, such as a valve. Such an arrangement is particularly adapted by subsea use by an ROV.

From the above, a stud tensioning tool 10 has been provided utilizing a driving connection provided between a worm gear 38 and a toothed gear 26 for rotation of a nut in a desired direction. Worm gear 38 has a helical thread 39 with a center concave shape for engaging the outer teeth 28 of adjacent toothed gear 26 for driving gear 26. Gear 26 may be rotated in opposite directions by reversing hydraulic motor 61.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A nut rotating tool comprising:

an outer housing having a gear receiving opening and a drive receiving opening intersecting said gear receiving opening and extending axially at right angles to said gear receiving opening;

a toothed gear mounted within said gear receiving opening and having a central opening for receiving and rotating a nut upon rotation of said toothed gear;

a worm gear received within said drive receiving opening and engaging said toothed gear in driving rotation for rotating said toothed gear;

a motor adapter housing bolted to said outer housing adjacent said drive receiving opening and extending outwardly of said drive receiving opening;

a drive shaft having said worm gear thereon and including an end drive connection extending within said motor adapter housing from one end of said drive shaft;

an end drive shaft member within said motor adapter housing and spaced axially from said end drive connection, said end drive shaft member having a splined drive connection on an outer end thereof extending beyond said motor adapter housing for mating engagement with a drive motor for rotating said drive shaft and worm gear thereon, said motor adapter housing having an outer splined end in concentric relation to said splined drive connection with the drive motor arranged for mating with said splined end of said motor adapter housing; and a connecting socket member within said motor adapter housing positioned between said axially spaced drive shaft and said end drive shaft member for connecting said drive shaft and said end drive shaft member in driving relation.

2. A nut rotating tool as defined in claim 1, wherein an abutment is positioned on said motor adapter housing adjacent said outer splined end for limiting axial movement of the drive motor for accurate positioning of the drive motor on said splined drive connection in a mating relation.

3. A nut rotating tool as defined in claim 1, wherein said connecting socket member has a socket on each end thereof for receiving said drive shaft and said end drive shaft member in mating relation.

4. A nut rotating tool as defined in claim 3, wherein said connecting socket member permits limited axial movement of said drive shaft and said end drive shaft member relative to said connecting socket member.

5. A nut rotating tool as defined in claim 1, further comprising;
- a drive adapter received within said toothed gear and having a drive pin extending therefrom adapted to fit within a drive socket for rotation of said drive socket, said drive adapter having an internally threaded central opening therein; and
- a retaining bolt threaded within said threaded central opening to maintain said drive adapter within said toothed gear.

* * * * *